(12) United States Patent
Muramoto

(10) Patent No.: US 8,654,391 B2
(45) Date of Patent: Feb. 18, 2014

(54) IMAGE FORMING DEVICE, INFORMATION PROCESSING DEVICE, AND RECORDING MEDIUM STORING N-UP PRINTING PROGRAM

(75) Inventor: Hideya Muramoto, Osaka (JP)

(73) Assignee: Kyocera Mita Corporation (JP)

( * ) Notice: Subject to any disclaimer, the term of this patent is extended or adjusted under 35 U.S.C. 154(b) by 278 days.

(21) Appl. No.: 13/190,572

(22) Filed: Jul. 26, 2011

(65) Prior Publication Data

US 2012/0026515 A1 Feb. 2, 2012

(30) Foreign Application Priority Data

Jul. 28, 2010 (JP) ................. 2010-169321

(51) Int. Cl.
*G06K 15/00* (2006.01)
*G06F 3/12* (2006.01)
(52) U.S. Cl.
USPC .......................... 358/1.18; 358/1.2; 358/1.13
(58) Field of Classification Search
None
See application file for complete search history.

(56) References Cited

U.S. PATENT DOCUMENTS

| | | | |
|---|---|---|---|
| 6,856,422 B1 | 2/2005 | Higashibata et al. | |
| 7,659,999 B2 * | 2/2010 | Karn et al. ................... | 358/1.12 |
| 2007/0146743 A1 * | 6/2007 | Karn et al. .................... | 358/1.9 |
| 2008/0137126 A1 * | 6/2008 | Yoshida ....................... | 358/1.14 |
| 2009/0244620 A1 * | 10/2009 | Takahashi et al. ........... | 358/1.15 |
| 2010/0165361 A1 * | 7/2010 | Booth et al. ................. | 358/1.2 |
| 2012/0086652 A1 * | 4/2012 | Kim et al. .................... | 345/173 |

FOREIGN PATENT DOCUMENTS

| | | |
|---|---|---|
| JP | 7-23211 | 1/1995 |
| JP | 2006-166220 | 6/2006 |
| JP | 2010-109864 | 5/2010 |

\* cited by examiner

*Primary Examiner* — Dov Popovici

(74) *Attorney, Agent, or Firm* — Gerald E. Hespos; Michael J. Porco; Matthew T. Hespos

(57) ABSTRACT

An image forming device includes: a storing unit that stores image data of plural pages, an operating unit and a setting unit that sets the number of sheets used for N-up printing of the plural pages. A determining unit determines the number of pages aggregated on a single side of a single sheet when N-up printing is performed using the number of sheets set by the setting unit. An orientation selecting unit selects a paper orientation that lowers a reduction ratio of a page when N-up printing is performed on the number of pages determined by the determining unit. An image forming unit uses the image data stored in the storing unit to form images of the plural pages onto sheets according to the number of sheets set by the setting unit, the number of pages determined by the determining unit, and the selected paper orientation.

12 Claims, 16 Drawing Sheets

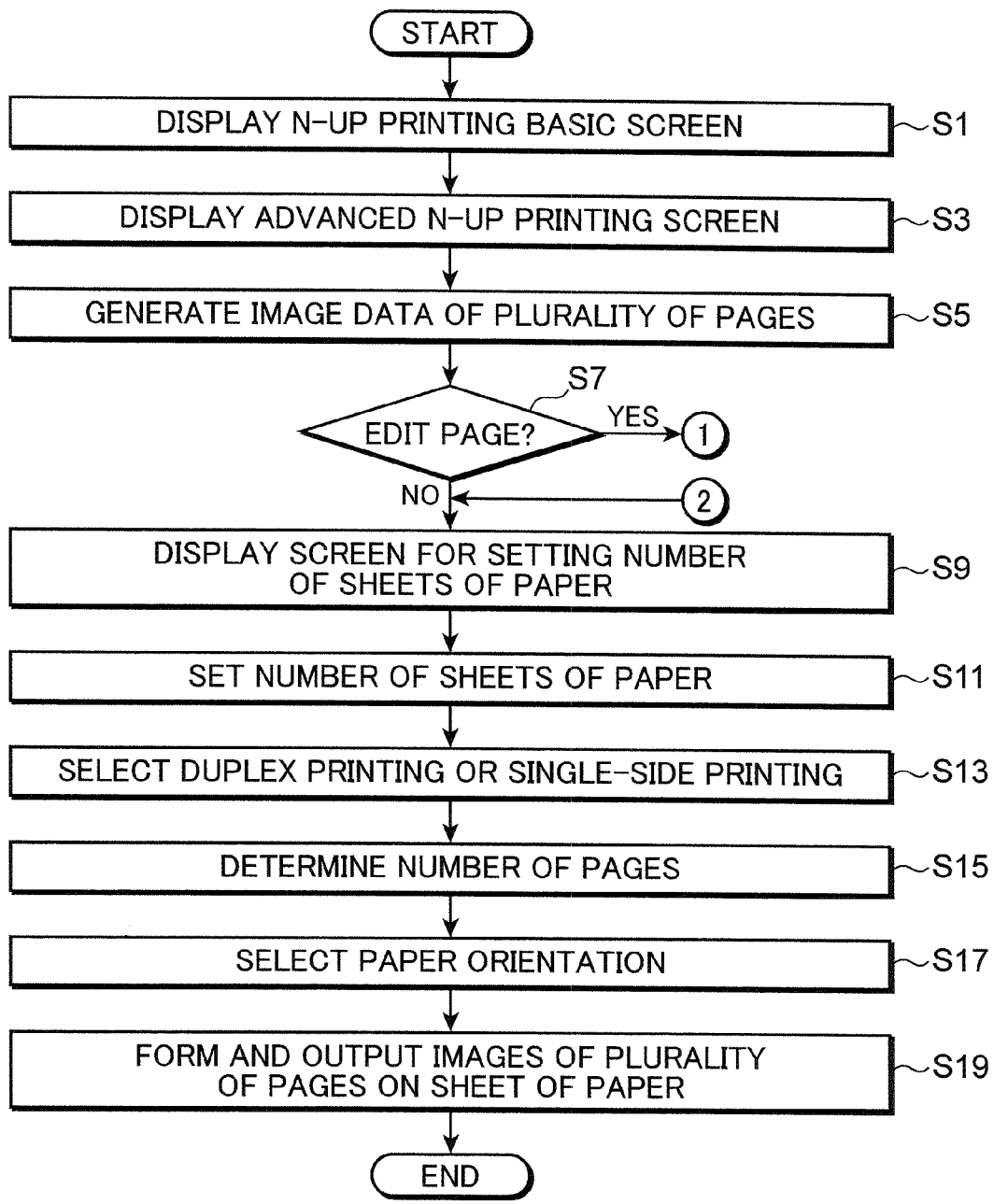

FIG.10

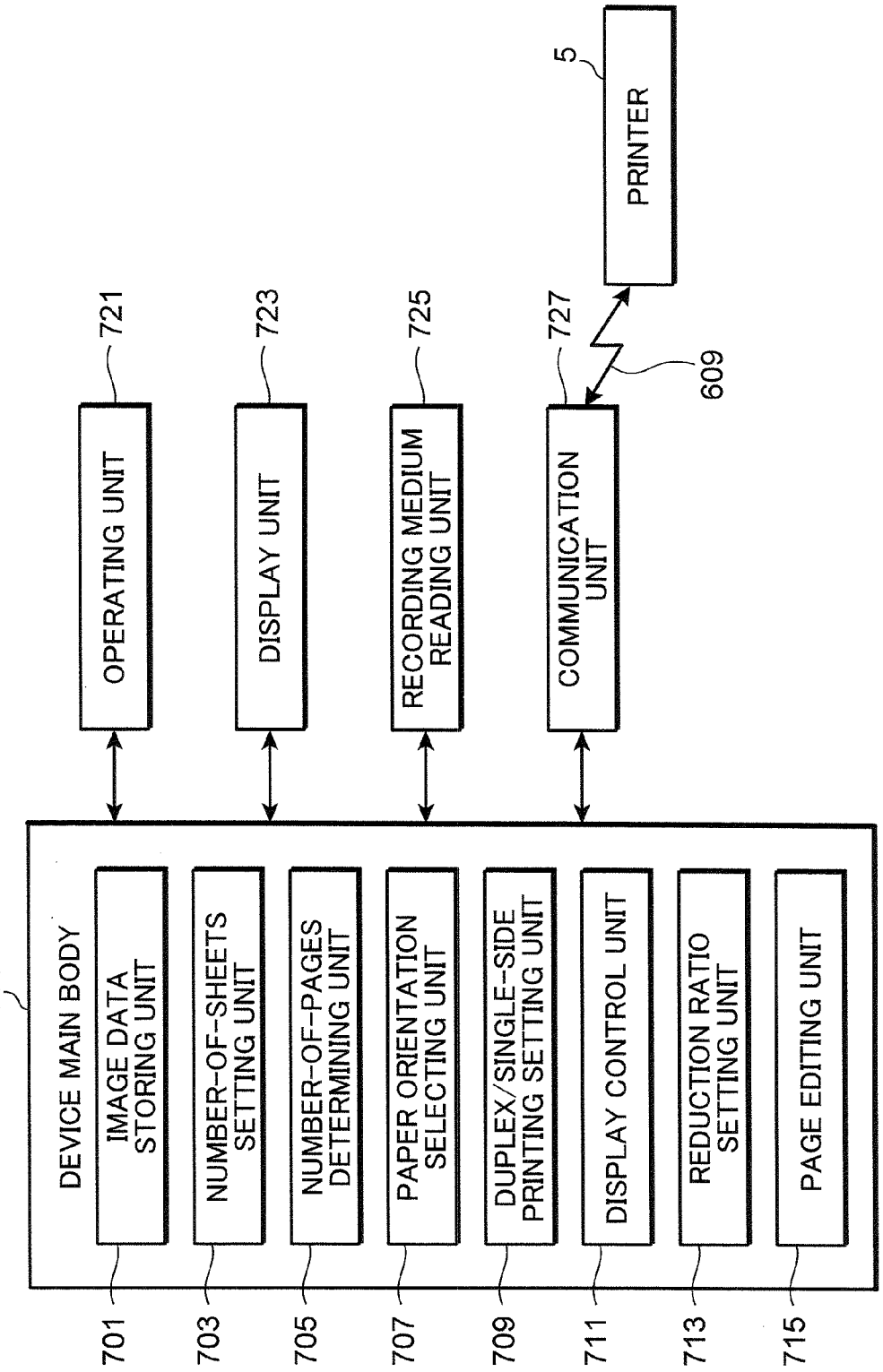

IMAGE FORMING DEVICE, INFORMATION PROCESSING DEVICE, AND RECORDING MEDIUM STORING N-UP PRINTING PROGRAM

BACKGROUND OF THE INVENTION

1. Field of the Invention

The present invention relates to an image forming device having an N-up printing function, an information processing device which causes the image forming device to execute N-up printing, and a recording medium.

2. Description of the Related Art

Some image forming devices such as a copier, a printer, a facsimile machine, and a multifunction machine (multifunction peripheral) are equipped with an N-up printing function. N-up printing refers to printing in which, for example, two pages or four pages are reduced in size and are formed and outputted on a print side of a sheet of paper (a front side and a reverse side in duplex printing, and a front side in single-side printing). N-up printing reduces the number of sheets of paper and therefore achieves paper saving.

As an image forming device having an N-up printing function, a technique is proposed in which the number of reads S performed on an original document is divided by the number of pages P of an original document to be aggregated, and in case of a final page of an original document even though a remainder is not "0", printing of an image in a page memory is started. According to this technique, a user need not perform an operation to have a blank original document read even if the number of pages of an original document is less than the number of pages required for aggregation (four or eight), such as cases where the original document includes three or seven pages.

In addition, a technique is proposed in which, when performing N-up printing, a preview image of a read original document having N-number of pages is displayed, and by having a user select a separator page, a layout of N-up printing can be easily instructed.

In N-up printing, desirably, paper is utilized in an efficient manner and unnecessary blank spaces are minimized. In addition, while pages are reduced in N-up printing, a reduction ratio of the pages is desirably minimized from the perspective of visibility.

SUMMARY OF THE INVENTION

An object of the present invention is to provide an image forming device capable of performing N-up printing which minimizes areas of unnecessary blank spaces and minimizes a reduction ratio of respective pages, an information processing device which causes the image forming device to execute N-up printing, and a recording medium.

An image forming device according to an aspect of the present invention which achieves the object described above includes: an image data storing unit which stores image data of a plurality of pages; an operating unit; a number-of-sheets setting unit which sets, in response to an operation performed on the operating unit, the number of sheets of paper that is used for N-up printing of the plurality of pages; a number-of-pages determining unit which determines the number of pages that is aggregated on a single side of a single sheet of paper when N-up printing of the plurality of pages is performed using the number of sheets of paper set by the number-of-sheets setting unit; a paper orientation selecting unit for selecting a paper orientation that enables a reduction ratio of a page to be lowered when N-up printing of the plurality of pages is performed on the number of pages determined by the number-of-pages determining unit; and an image forming unit which uses the image data of the plurality of pages stored in the image data storing unit to form images of the plurality of pages onto sheets of paper according to the number of sheets of paper set by the number-of-sheets setting unit, the number of pages determined by the number-of-pages determining unit, and the paper orientation selected by the paper orientation selecting unit.

An information processing device according to another aspect of the present invention includes: an image data storing unit which stores image data of a plurality of pages; an operating unit; a number-of-sheets setting unit which sets, in response to an operation performed on the operating unit, the number of sheets of paper that is used for N-up printing of the plurality of pages; a number-of-pages determining unit which determines the number of pages that is aggregated on a single side of a single sheet of paper when N-up printing of the plurality of pages is performed using the number of sheets of paper set by the number-of-sheets setting unit; a paper orientation selecting unit for selecting a paper orientation that enables a reduction ratio of a page to be lowered when N-up printing of the plurality of pages is performed on the number of pages determined by the number-of-pages determining unit; and a transmitting unit which transmits, to a printer, data of the number of sheets of paper set by the number-of-sheets setting unit, the number of pages determined by the number-of-pages determining unit, and the paper orientation selected by the paper orientation selecting unit, together with image data of the plurality of pages.

A recording medium according to yet another aspect of the present invention is a computer-readable recording medium storing an N-up printing program, wherein the program causes a computer to function as: an image data storing unit which stores image data of a plurality of pages; an operating unit; a number-of-sheets setting unit which sets, in response to an operation performed on the operating unit, the number of sheets of paper that is used for N-up printing of the plurality of pages; a number-of-pages determining unit which determines the number of pages that is aggregated on a single side of a single sheet of paper when N-up printing of the plurality of pages is performed using the number of sheets of paper set by the number-of-sheets setting unit; a paper orientation selecting unit for selecting a paper orientation that enables a reduction ratio of a page to be lowered when N-up printing of the plurality of pages is performed on the number of pages determined by the number-of-pages determining unit; and a transmitting unit which transmits, to a printer, data of the number of sheets of paper set by the number-of-sheets setting unit, the number of pages determined by the number-of-pages determining unit, and the paper orientation selected by the paper orientation selecting unit, together with image data of the plurality of pages.

BRIEF DESCRIPTION OF THE DRAWINGS

FIG. 4 is a flow chart for explaining N-up printing using an image forming device according to the first embodiment.

FIG. 10 is a diagram showing a relationship between six pages and N-up printing.

FIG. 16 is a block diagram showing a configuration of an information processing device according to a second embodiment of the present invention.

DETAILED DESCRIPTION OF THE PREFERRED EMBODIMENTS

Figure 1:
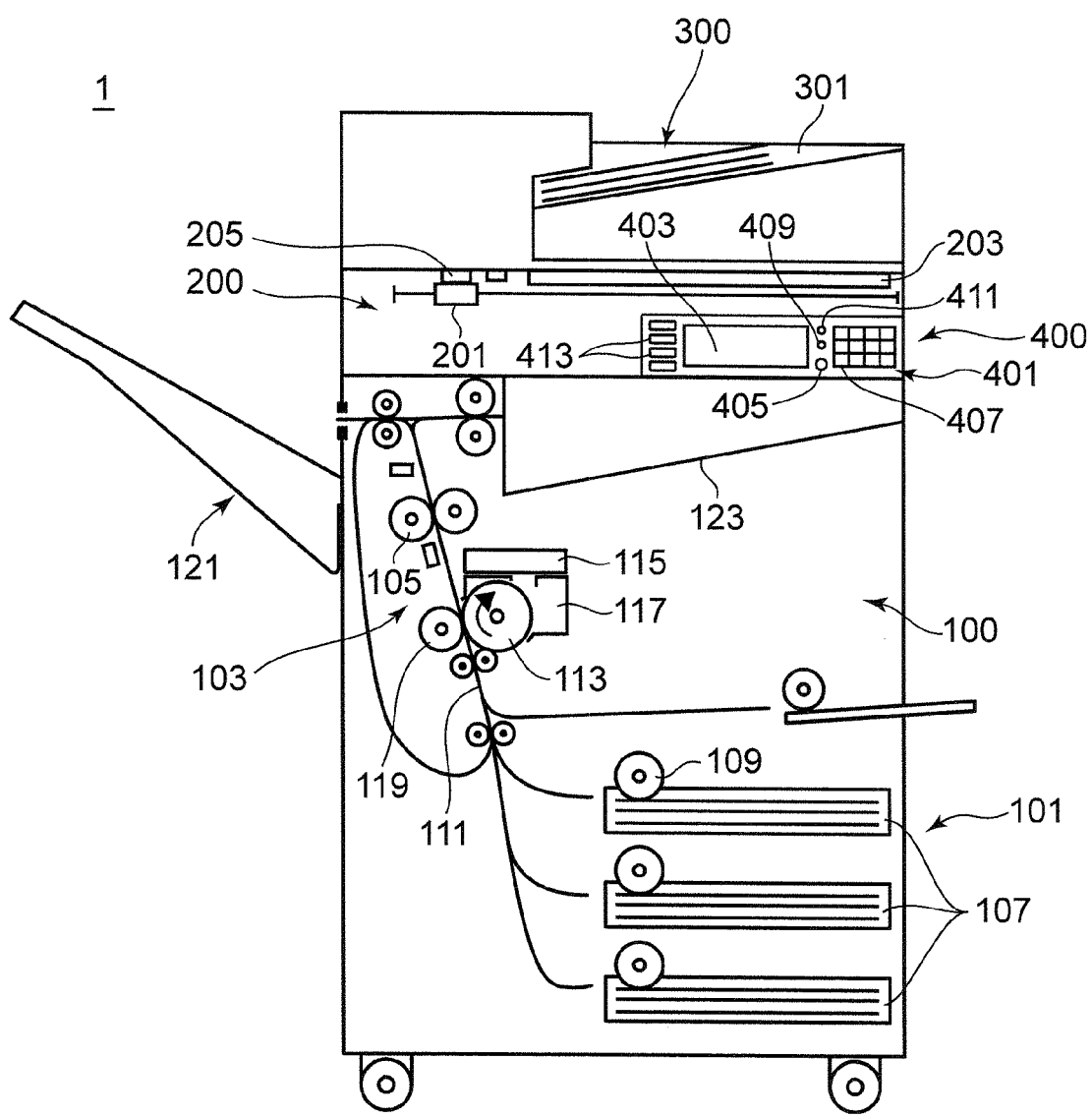
FIG. 1 is a diagram schematically showing an internal structure of an image forming device according to a first embodiment of the present invention.

Hereinafter, an embodiment of the present invention will be described in detail with reference to the drawings. FIG. 1 is a diagram schematically showing an internal structure of an image forming device 1 according to a first embodiment of the present invention. The image forming device 1 is applicable to, for example, a digital multifunction machine (multifunction peripheral) equipped with copier, printer, scanner, and facsimile functions. The image forming device 1 includes a device main body 100, an original document reading unit 200 arranged on the device main body 100, an original document feeding unit 300 arranged on the original document reading unit 200, and an operating unit 400 arranged on an upper front face of the device main body 100.

The original document feeding unit 300 functions as an automatic original document feeding device and is capable of continuously sending an original document which includes a plurality of pages and which is placed on an original document mounting unit 301 to the original document reading unit 200.

The original document reading unit 200 includes a carriage 201 equipped with an exposure lamp or the like, an platen 203 constituted by a transparent member such as glass, a CCD (Charge Coupled Device) sensor (not shown), and an original document reading slit 205. When reading an original document placed on the platen 203, the original document is read by the CCD sensor while moving the carriage 201 in a longitudinal direction of the platen 203. On the other hand, when reading an original document fed from the original document feeding unit 300, the carriage 201 is moved to a position opposing the original document reading slit 205 and the original document fed from the original document feeding unit 300 is read by the CCD sensor through the original document reading slit 205. The CCD sensor outputs the read original document as image data.

The device main body 100 includes a paper storing unit 101, an image forming unit 103, and a fixing unit 105. The paper storing unit 101 is arranged at a lowermost part of the device main body 100 and includes a paper tray 107 capable of storing a stack of paper. Among a stack of paper stored in the paper tray 107, an uppermost sheet of paper is fed out toward a paper conveying path 111 due to driving by a pick-up roller 109. The sheet of paper is conveyed through the paper conveying path 111 to the image forming unit 103.

The image forming unit 103 forms a toner image on the conveyed sheet of paper. The image forming unit 103 includes a photosensitive drum 113, an exposure unit 115, a developing unit 117, and a transferring unit 119. The exposure unit 115 generates light corresponding to image data (image data outputted from the original document reading unit 200, image data transmitted from a personal computer, image data received via facsimile, and the like), and irradiates a circumferential surface of the photosensitive drum 113 that has been uniformly charged. Accordingly, an electrostatic latent image corresponding to the image data is formed on the circumferential surface of the photosensitive drum 113. In this state, by supplying toner to the circumferential surface of the photosensitive drum 113 from the developing unit 117, a toner image corresponding to the image data is formed on the circumferential surface. The toner image is transferred by the transferring unit 119 onto the sheet of paper conveyed from the paper storing unit 101 described earlier.

The sheet of paper on which the toner image has been transferred is sent to the fixing unit 105. At the fixing unit 105, heat and pressure are applied to the toner image and to the sheet of paper and the toner image is fixed onto the sheet of paper. The sheet of paper is discharged to a stack tray 121 or a discharge tray 123.

The operating unit 400 includes an operating key unit 401 and a display unit 403. The display unit 403 is equipped with a touch panel function and displays a screen including soft keys. By operating the soft keys while viewing the screen, a user may input settings necessary for executing functions such as copying or the like.

The operating key unit 401 is provided with operating keys constituted by hard keys. Specifically, the operating key unit 401 is provided with a start key 405, a numeric keypad 407, a stop key 409, a reset key 411, a function switching key 413 for switching among a copier, a printer, a scanner, and a facsimile, and the like.

The start key 405 is for staring operations such as copying and facsimile transmission. The numeric keypad 407 is for inputting a numeral such as the number of copies to be made and a facsimile number. The stop key 409 is for cancelling a copy operation or the like that is in progress. The reset key 411 is for cancelling set contents.

The function switching key 413 includes a copying key, a transmission key, and the like and switches among a copying function, a transmission function, and the like. Operating the copying key causes an initial screen of copying to be displayed on the display unit 403. Operating the transmission key causes an initial screen of facsimile transmission and e-mail transmission to be displayed on the display unit 403.

Figure 2:
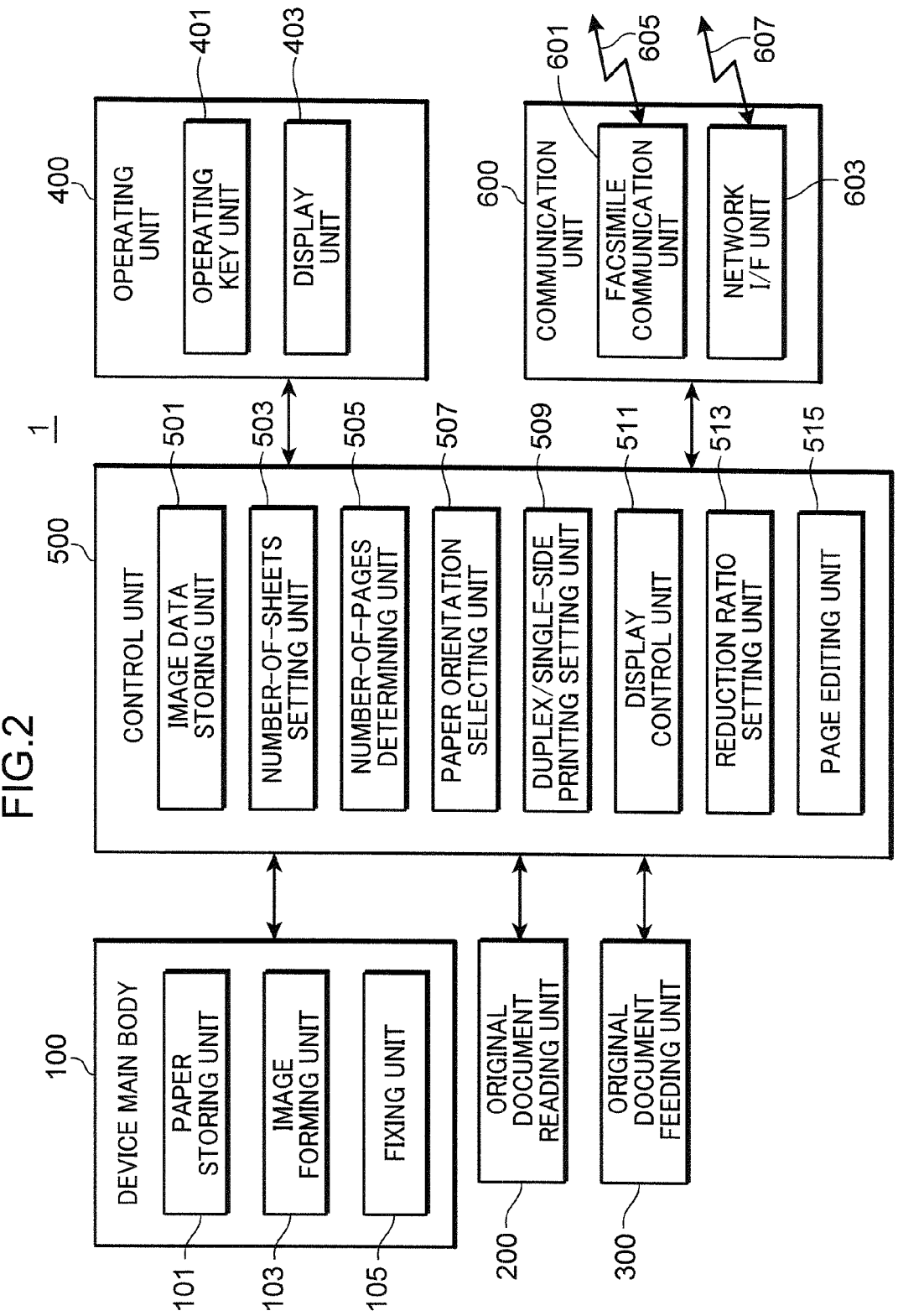
FIG. 2 is a block diagram showing a configuration of the image forming device shown in FIG. 1.

FIG. 2 is a block diagram showing a configuration of the image forming device 1 shown in FIG. 1. The image forming device 1 is configured such that the device main body 100, the original document reading unit 200, the original document feeding unit 300, the operating unit 400, a control unit 500, and a communication unit 600 are mutually connected by a bus. Since the device main body 100, the original document reading unit 200, the original document feeding unit 300, and the operating unit 400 have already been described, a description thereof will be omitted.

The control unit 500 includes a CPU (Central Processing Unit), a ROM (Read Only Memory), a RAM (Random Access Memory), an image memory, and the like. The CPU executes control necessary for operating the image forming device 1 over hardware described above which constitutes the image forming device 1. The ROM stores software necessary for controlling operations of the image forming device 1. The RAM is used for temporarily storing data generated when executing software, storing applications, and the like. The image memory temporarily stores image data (image data outputted from the original document reading unit 200, image data transmitted from a personal computer, image data received via facsimile, and the like).

The control unit 500 includes an image data storing unit 501, a number-of-sheets setting unit 503, a number-of-pages determining unit 505, a paper orientation selecting unit 507, a duplex/single-side printing setting unit 509, a display control unit 511, a reduction ratio setting unit 513, and a page editing unit 515.

The image data storing unit 501 stores image data of a plurality of pages to be subjected to N-up printing. The image data includes image data that is read by the original document reading unit 200, image data that is received by the image forming device 1 via facsimile communication, and the like.

The number-of-sheets setting unit 503 sets, in response to an operation performed on the operating unit 400, the number of sheets of paper that is used in N-up printing of a plurality of pages. For example, when a user wishes to perform N-up printing on two sheets of paper, the user operates the operating unit 400 and sets the number of sheets of paper to two.

The number-of-pages determining unit 505 determines the number of pages that is aggregated to a single side of a single sheet of paper when N-up printing of a plurality of pages is performed on the number of sheets of paper set by the number-of-sheets setting unit 503. In single-side printing, the number of pages that is aggregated to a single side of a single sheet of paper refers to the number of pages that is aggregated to a single side of a sheet of paper. In duplex printing, the number of pages that is aggregated to a single side of a single sheet of paper refers to the number of pages that is respectively aggregated to one side and another side of a sheet of paper.

The paper orientation selecting unit 507 selects a paper orientation that enables a page reduction ratio to be lowered when N-up printing of a plurality of pages is performed according to the number of pages determined by the number-of-pages determining unit 505. When reduction ratios of a page differ depending on whether the paper orientation is portrait or landscape, whichever orientation that realizes a lower page reduction ratio is selected.

A page reduction ratio indicates to what degree a page has been reduced from its original size and the lower the reduction ratio, the closer to the original size of the page. For example, a reduction ratio of 10% means that the page is reduced by 10% and does not mean that the page is reduced to 10% of its original size. Therefore, for example, a page with a reduction ratio of 10% has a greater size than a page with a reduction ratio of 90%.

In response to an operation performed on the operating unit 400, the duplex/single-side printing setting unit 509 makes a setting for selecting duplex printing or single-side printing when performing N-up printing of a plurality of pages. Accordingly, the user can select duplex printing or single-side printing for N-up printing. The number-of-pages determining unit 505 determines the number of pages in accordance with duplex printing or single-side printing set by the duplex/single-side printing setting unit 509.

Based on the number of sheets of paper set by the number-of-sheets setting unit 503, the number of pages set by the number-of-pages determining unit 505, the paper orientation set by the paper orientation selecting unit 507, and the printing method (duplex printing or single-side printing) set by the duplex/single-side printing setting unit 509, the image forming unit 103 uses image data of a plurality of pages stored in the image data storing unit 501 to form images of the plurality of pages on a sheet (or sheets) of paper and output the images.

The display control unit 511 controls the display unit 403 to cause various operation screens to be displayed on the display unit 403. Screens displayed on the display unit 403 include N-up printing preview screens for duplex printing and for single-side printing which are displayed when selecting duplex printing or single-side printing. The display control unit 511 causes an N-up printing preview screen to be displayed on the display unit 403 after the number of sheets is set to the number-of-sheets setting unit 503.

A setting is made to the reduction ratio setting unit 513 to change a page reduction ratio when performing N-up printing of a plurality of pages in response to an operation performed on the operating unit 400 and after a preview screen is displayed on the display unit 403.

Figure 3:
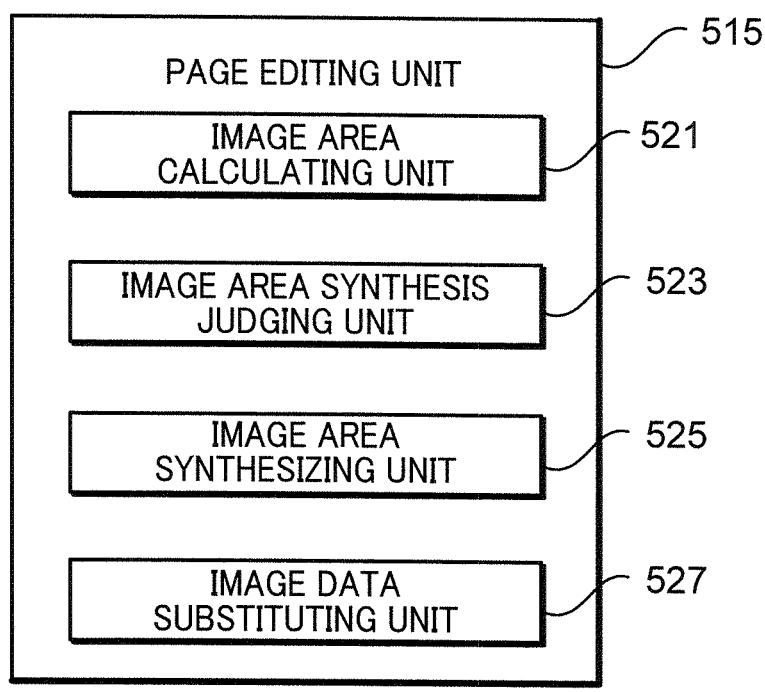
FIG. 3 is a block diagram showing a functional configuration of a page editing unit.

The page editing unit 515 executes editing with respect to image data of a plurality of pages stored in the image data storing unit 501 so as to reduce the number of the plurality of pages. FIG. 3 is a block diagram showing a functional configuration of the page editing unit 515.

The page editing unit 515 includes an image area calculating unit 521, an image area synthesis judging unit 523, an image area synthesizing unit 525, and an image data substituting unit 527. The image area calculating unit 521 uses the image data of a plurality of pages stored in the image data storing unit 501 to calculate a size of an image area in which an image of each of the plurality of pages is formed. With respect to the size of the image area calculated by the image area calculating unit 521, the image area synthesis judging unit 523 judges whether or not a value of a sum of sizes of image areas of two adjacent pages among the respective pages is smaller than a predetermined value.

With respect to two adjacent pages which are judged to be smaller than the predetermined value by the image area synthesis judging unit 523, the image area synthesizing unit 525 generates image data in which the image areas of the two adjacent pages are synthesized into a single page. With respect to image data of the plurality of pages stored in the image data storing unit 501, the image data substituting unit 527 substitutes image data of two adjacent pages for which the value is judged to be smaller than the predetermined value with the single page image data generated by the image area synthesizing unit 525.

The number-of-pages determining unit 505 shown in FIG. 2 determines the number of pages based on the plurality of pages edited by the page editing unit 515. The image forming unit 103 uses the image data of the plurality of pages which is stored in the image data storing unit 501 and which has been edited by the page editing unit 515 to form images of a plurality of pages on a sheet (or sheets) of paper.

The communication unit 600 includes a facsimile communication unit 601 and a network I/F unit 603. The facsimile communication unit 601 is equipped with an NCU (Network Control Unit) which controls telephone line connection to a destination facsimile machine and a modulating/demodulating circuit which modulates or demodulates a facsimile communication signal. The facsimile communication unit 601 is connected to a telephone line 605.

The network I/F unit 603 is connected to a LAN (Local Area Network) 607. The network I/F unit 603 is a communication interface circuit for executing communication with a terminal device such as a personal computer connected to the LAN 607.

Next, N-up printing using the image forming device 1 according to the first embodiment will be described. FIG. 4 is a flow chart for explaining the N-up printing. FIGS. 5A to 5E are diagrams showing a transition of screens displayed on the display unit 403 when setting N-up printing.

Figure 5A:
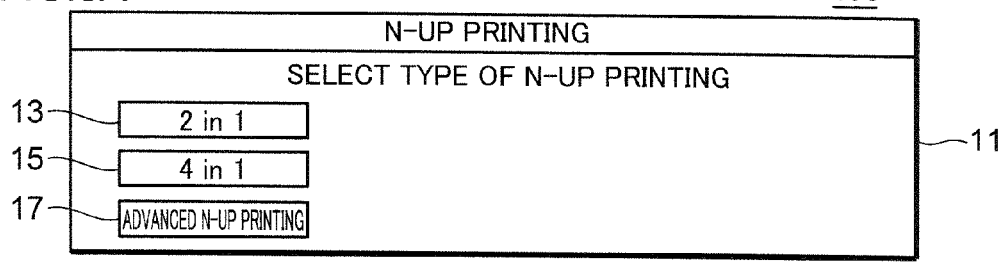
FIGS. 5A to 5E are diagrams showing a transition of screens displayed on a display unit when setting N-up printing.

When the user operates the operating unit 400, the display control unit 511 displays an N-up printing basic screen 11 shown in FIG. 5A on the display unit 403 (step S1). The basic screen 11 includes buttons that enable types of N-up printing to be selected. Specifically, the N-up printing basic screen 11 includes a button 13 inscribed "2 in 1", a button 15 inscribed "4 in 1", and a button 17 inscribed "advanced N-up printing". Advanced N-up printing refers to N-up printing related to the present embodiment and enables a user to select how many sheets of paper an original document is aggregated to in N-up printing. For example, in a case of N-up printing of an original document having six pages, the user can select any of aggregating the original document to a single sheet of paper, aggregating the original document to two sheets of paper, and aggregating the original document to three sheets of paper.

Figure 5B:
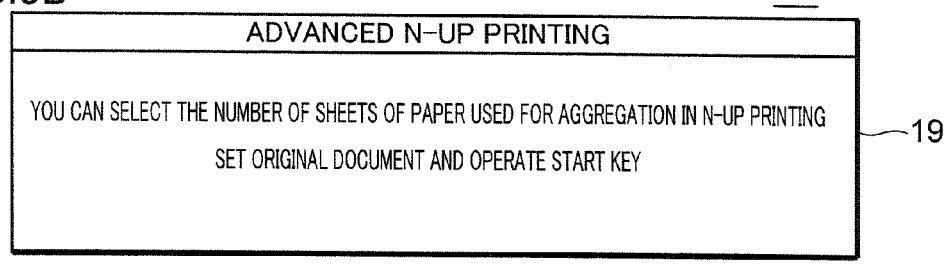

When the user operates the button 17 inscribed "advanced N-up printing", the display control unit 511 displays an advanced N-up printing screen 19 shown in FIG. 5B on the display unit 403 (step S3).

When the user sets an original document having a plurality of pages which is an aggregation object onto the original document mounting unit 301 and presses the start key 405 shown in FIG. 1, the original document having a plurality of pages is read by the original document reading unit 200 and image data of the plurality of pages is generated (step S5). The image data is in, for example, bitmap format and is stored in the image data storing unit 501. With single-side reading of the original document, image data of the same number of pages as the original document is generated, and with duplex reading of the original document, image data of twice the number of pages as the original document is generated.

Figure 5C:
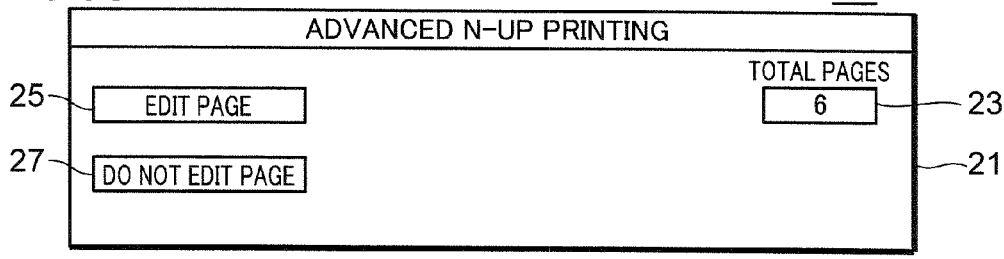

Once reading of the original document is completed, a screen 21 showing an original document reading result shown in FIG. 5C is displayed by the display control unit 511 on the display unit 403. A "total pages" field 23 displays the number of the plurality of pages described in step S5. For example, in a case of single-side reading of an original document having six pages, "6" is displayed.

By operating a button 25 inscribed "edit page", N-up printing can be performed after performing editing in which the number of the plurality of pages is reduced. This is used when an area of an image area that is a formation area of an image in a page is small or, in other words, when there is a large blank space. If the aggregation object has six pages, N-up printing can be performed after editing the number of pages to a number smaller than six. Details of page editing will be described later.

Figure 5D:
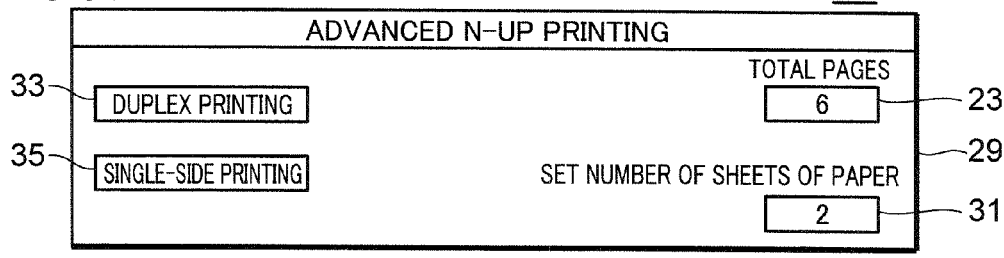

When the user operates a button 27 inscribed "do not edit page", page editing is not performed (No in step S7) and a screen 29 for setting the number of sheets of paper shown in FIG. 5D is displayed by the display control unit 511 on the display unit 403 (step S9). The screen 29 includes a number-of-sheets field 31 for inputting the number of sheets of paper. For example, in a case of N-up printing of six pages, when the user selects to aggregate the six pages to two sheets of paper, the user operates the operating unit 400 to input "2" into the number-of-sheets field 31. Accordingly, a setting for using two sheets of paper in N-up printing is made to the number-of-sheets setting unit 503 (step S11).

The screen 29 includes a button 33 inscribed "duplex printing" and a button 35 inscribed "single-side printing". When the button 33 is operated, N-up printing in which printing is performed on both sides of a sheet of paper can be selected. When the button 35 is operated, N-up printing in which printing is performed on one side of a sheet of paper can be selected. The user selects either duplex printing or single-side printing (step S13). A sequence of step S11 and step S13 is reversible. In other words, the number of sheets of paper can be set after selecting either duplex printing or single-side printing.

Based on the setting made in step S11 and the selection made in step S13, the number-of-pages determining unit 505 determines the number of pages that is aggregated onto a single side of a single sheet of paper when performing N-up printing of a plurality of pages (step S15). For example, in a case of N-up printing of six pages by single-side printing, when two sheets of paper are used, three pages are aggregated onto a single side of a single sheet of paper, and when three sheets of paper are used, two pages are aggregated onto a single side of a single sheet of paper. In a case of N-up printing of eight pages by duplex printing, when one sheet of paper is used, four pages are aggregated onto a single side of a single sheet of paper (four pages are respectively aggregated onto a front side and a reverse side of the sheet of paper), and when two sheets of paper are used, two pages are aggregated onto a single side of a single sheet of paper.

Figure 6:
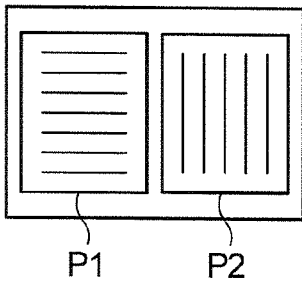
FIG. 6 is a diagram for explaining a relationship between the number of pages and paper orientation.

The paper orientation selecting unit 507 selects a paper orientation that enables a page reduction ratio to be lowered when N-up printing of a plurality of pages is performed according to the number of pages determined in step S15 (step S17). FIG. 6 is a diagram for explaining a specific example of a relationship between the number of pages and an orientation of a sheet of paper 41. Reference character P1 denotes a first page, P2 denotes a second page, P3 denotes a third page, and P4 denotes a fourth page. If two or three pages are aggregated onto a single side of the single sheet of paper 41, the page reduction ratio can be lowered more when the orientation of the sheet of paper 41 is landscape instead of portrait. Therefore, if there are two or three pages, landscape is selected as the orientation of the sheet of paper 41. On the other hand, if four pages are aggregated onto a single side of the single sheet of paper 41, the page reduction ratio can be lowered more when the orientation of the sheet of paper 41 is portrait instead of landscape. Therefore, if there are four pages, portrait is selected as the orientation of the sheet of paper 41.

Based on the setting made in step S11, the selection made in step S13, the number of pages set in step S15, and the selection made in step S17, the image forming unit 103 forms an image of a plurality of pages on a sheet of paper using the image data of the plurality of pages stored in the image data storing unit 501 (step S19). Accordingly, N-up printing of a plurality of pages is completed. FIGS. 7 to 10 are diagrams showing specific examples of relationships between pluralities of pages and N-up printing. Page images are all set to portrait.

Figure 7:
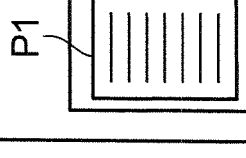
FIG. 7 is a diagram showing a relationship between two pages and N-up printing.

FIG. 7 shows a case of N-up printing of two pages on a single sheet of paper. In duplex printing, portrait is selected as a paper orientation, an image of a first page P1 at a reduction ratio of 0% is formed on a front side of a sheet of paper, and an image of a second page P2 at a reduction ratio of 0% is formed on a reverse side of the sheet of paper. On the other hand, in single-side printing, landscape is selected as the paper orientation, and images of the first page P1 and the second page P2 at a reduction ratio of 30% are formed on the front side of a sheet of paper.

Figure 8:
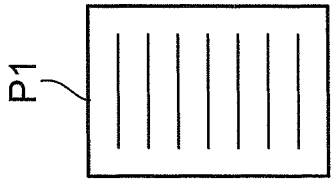
FIG. 8 is a diagram showing a relationship between three pages and N-up printing.

FIG. 8 shows a case of N-up printing of three pages on a single sheet of paper. In duplex printing, for the front side, portrait is selected as a paper orientation and an image of a first page P1 at a reduction ratio of 0% is formed. For the reverse side, landscape is selected as a paper orientation and images of a second page P2 and a third page P3 at a reduction ratio of 30% are formed. While paper orientation differs between the front side and the reverse side in a single sheet of paper, such printing can be realized by rotating page images by 90 degrees before printing for one of the front side and the reverse side. For example, if the sheet of paper is conveyed in a landscape orientation, processing for rotating the image of the first page P1 by 90 degrees is performed and the image is printed on the front side of the sheet of paper.

On the other hand, in single-side printing, landscape is selected as the paper orientation, and images of the first page P1, the second page P2, and the third page P3 at a reduction ratio of 47% are formed on the front side of a sheet of paper.

Figure 9:
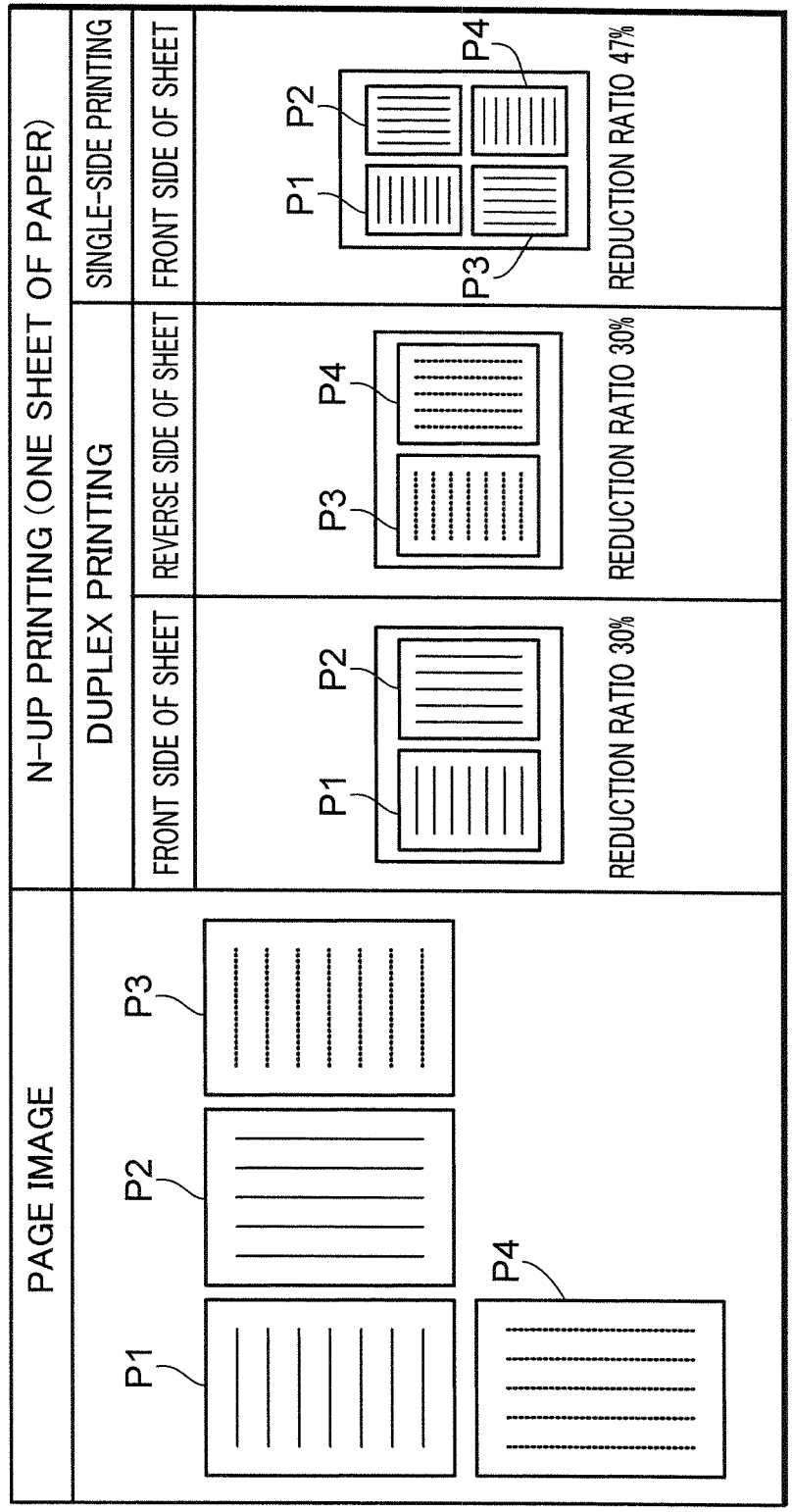
FIG. 9 is a diagram showing a relationship between four pages and N-up printing.

FIG. 9 shows a case of N-up printing of four pages on a single sheet of paper. In duplex printing, landscape is selected as the paper orientation. Images of the first page P1 and the second page P2 at a reduction ratio of 30% are formed on a front side of a sheet of paper, and images of the third page P3 and the fourth page P4 at a reduction ratio of 30% are formed on a reverse side of the sheet of paper. In single-side printing, portrait is selected as the paper orientation, and images of the first page P1, the second page P2, the third page P3, and the fourth page P4 at a reduction ratio of 47% are formed.

Figure 10:
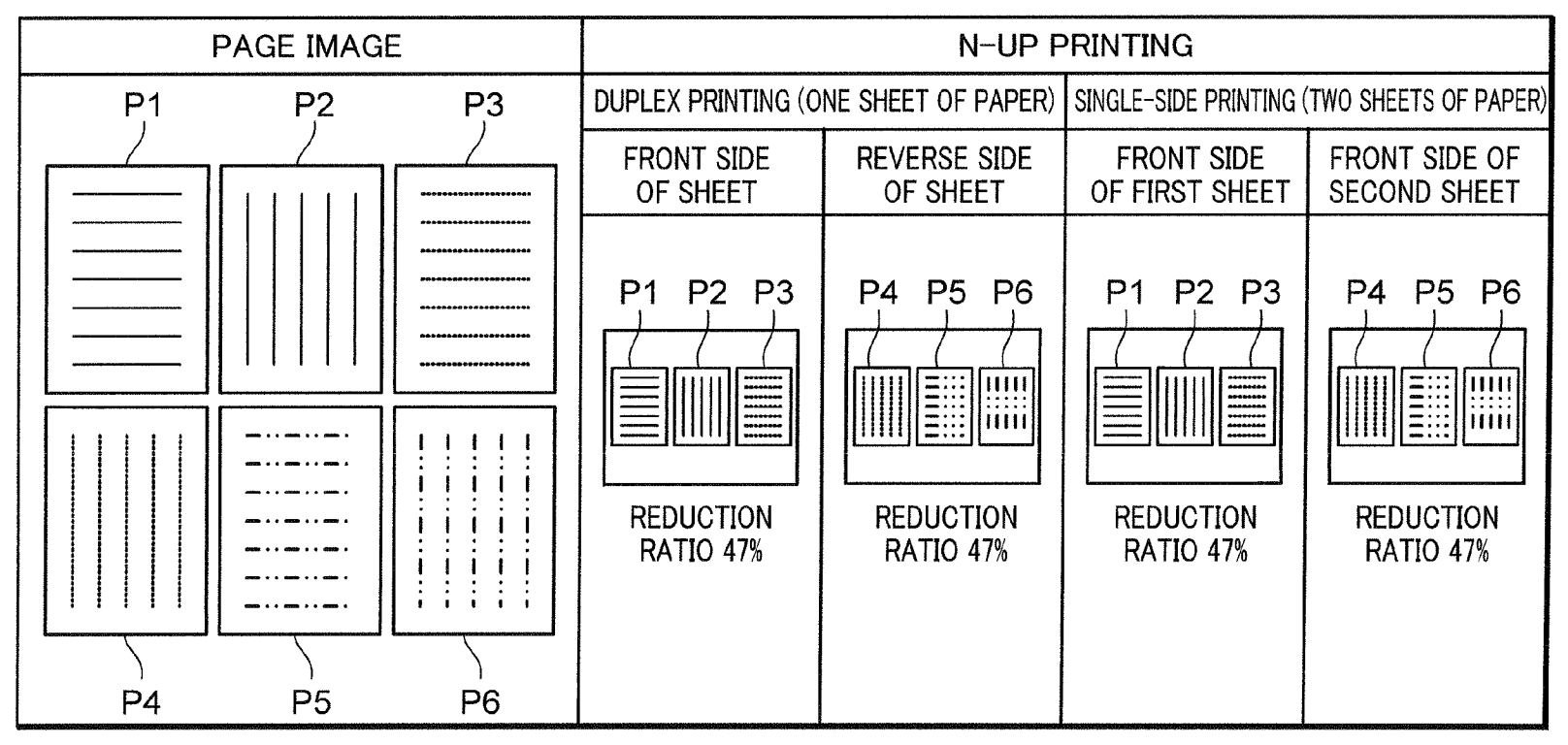

FIG. 10 shows a case of N-up printing of six pages. In duplex printing, if there is one sheet of paper, landscape is selected as the paper orientation. Images of the first page P1, the second page P2, and the third page P3 at a reduction ratio of 47% are formed on a front side of the sheet of paper, and images of the fourth page P4, a fifth page P5, and a sixth page P6 at a reduction ratio of 47% are formed on a reverse side of the sheet of paper. In single-side printing, if there are two sheets of paper, landscape is selected as the paper orientation. Images of the first page P1, the second page P2, and the third page P3 at a reduction ratio of 47% are formed on a front side of the first sheet of paper, and images of the fourth page P4, the fifth page P5, and the sixth page P6 at a reduction ratio of 47% are formed on a front side of the second sheet of paper. Moreover, although not shown, when one sheet of paper is used in single-side printing, landscape is selected as a paper orientation, and reduced images of the first to sixth pages P1, P2, P3, P4, P5, and P6 are formed on the front side of the sheet of paper.

Figure 11:
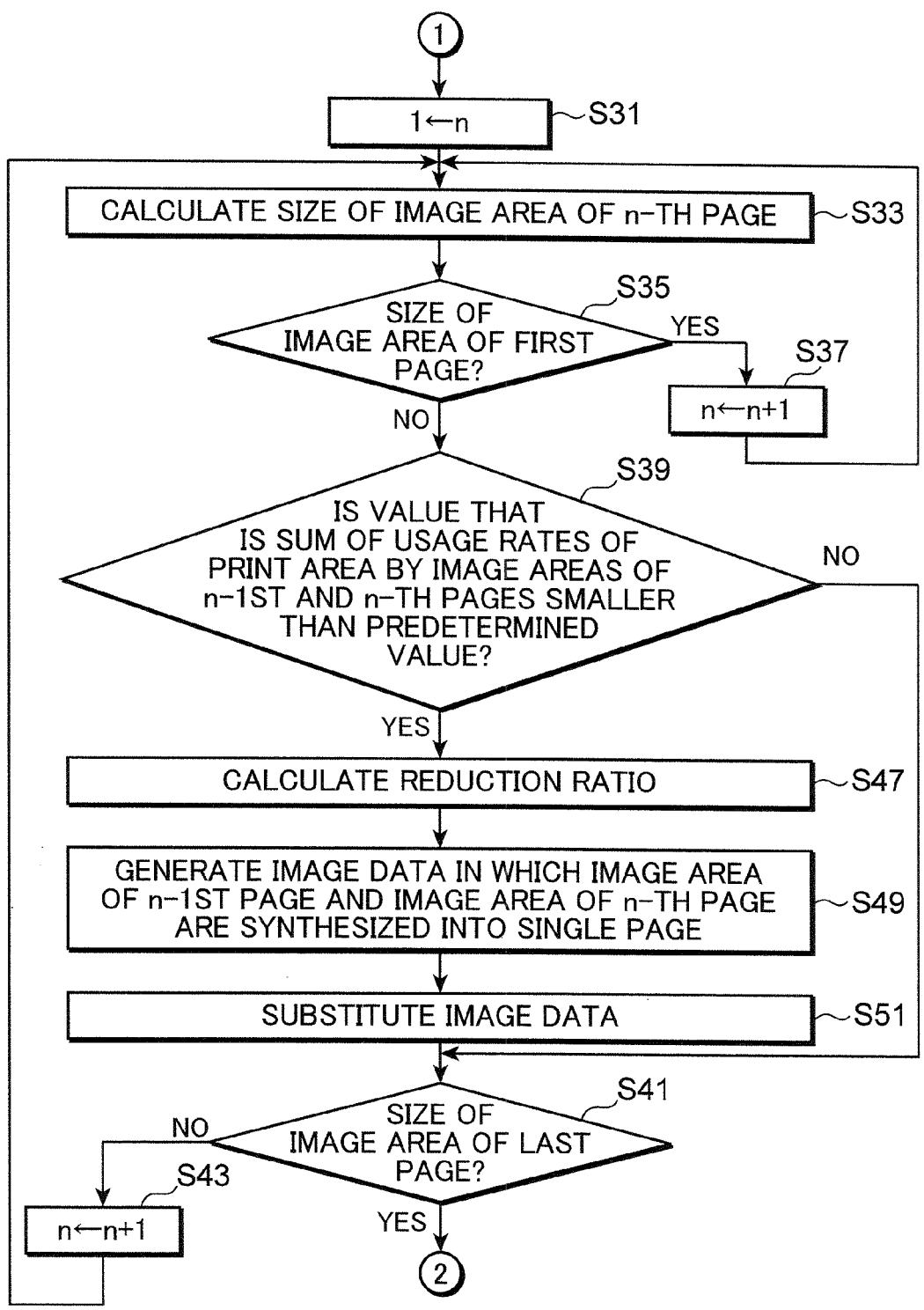
FIG. 11 is a flow chart for explaining page editing.

Next, a case where page editing is selected in step S7 of FIG. 4 will be described. FIG. 11 is a flow chart for explaining page editing. Page editing is executed by a component of a function block shown in FIG. 3. When the button 25 inscribed "edit page" shown in FIG. 5C is operated (Yes in step S7), the page editing unit 515 sets n to 1 (step S31), and the image area calculating unit 521 calculates a size of an image area of an n-th page (step S33). In other words, sizes of image areas are sequentially calculated from the first page.

Figure 12:
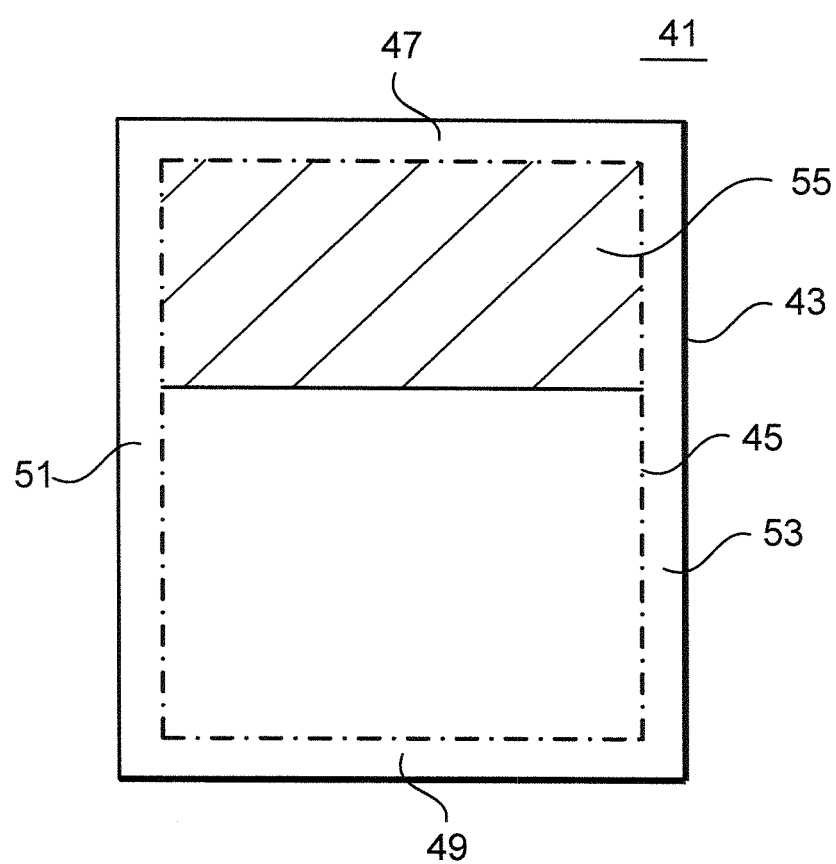
FIG. 12 is a diagram showing a relationship among an image area, a print side, and a print area.

An image area, a print side, and a print area will now be described with reference to FIG. 12. A print side 43 refers to a side of the sheet of paper 41 on which an image is formed. In single-side printing, a front side of the sheet of paper 41 becomes the print side 43. In duplex printing, the front and reverse sides of the sheet of paper 41 become the print side 43. The print side 43 is constituted by a print area 45 in which an image can be formed, an upper margin 47 located above the print area 45, a lower margin 49 located below the print area 45, a left margin 51 located to the left of the print area 45, and a right margin 53 located to the right of the print area 45. An image area 55 is an area in which an image is formed and is located in the print area 45. For example, in a case where a text image of 30 lines can be printed in the print area 45, if a text image exists from a first line to a tenth line and subsequent lines are blank spaces, then the text image from the first to tenth lines becomes the image area 55. When a size of the image area 55 is equal to a size of the print area 45, a percentage of the image area 55 in the print area 45 or, in other words, a usage rate of the print area 45 by the image area 55 becomes 100%.

Figure 13:
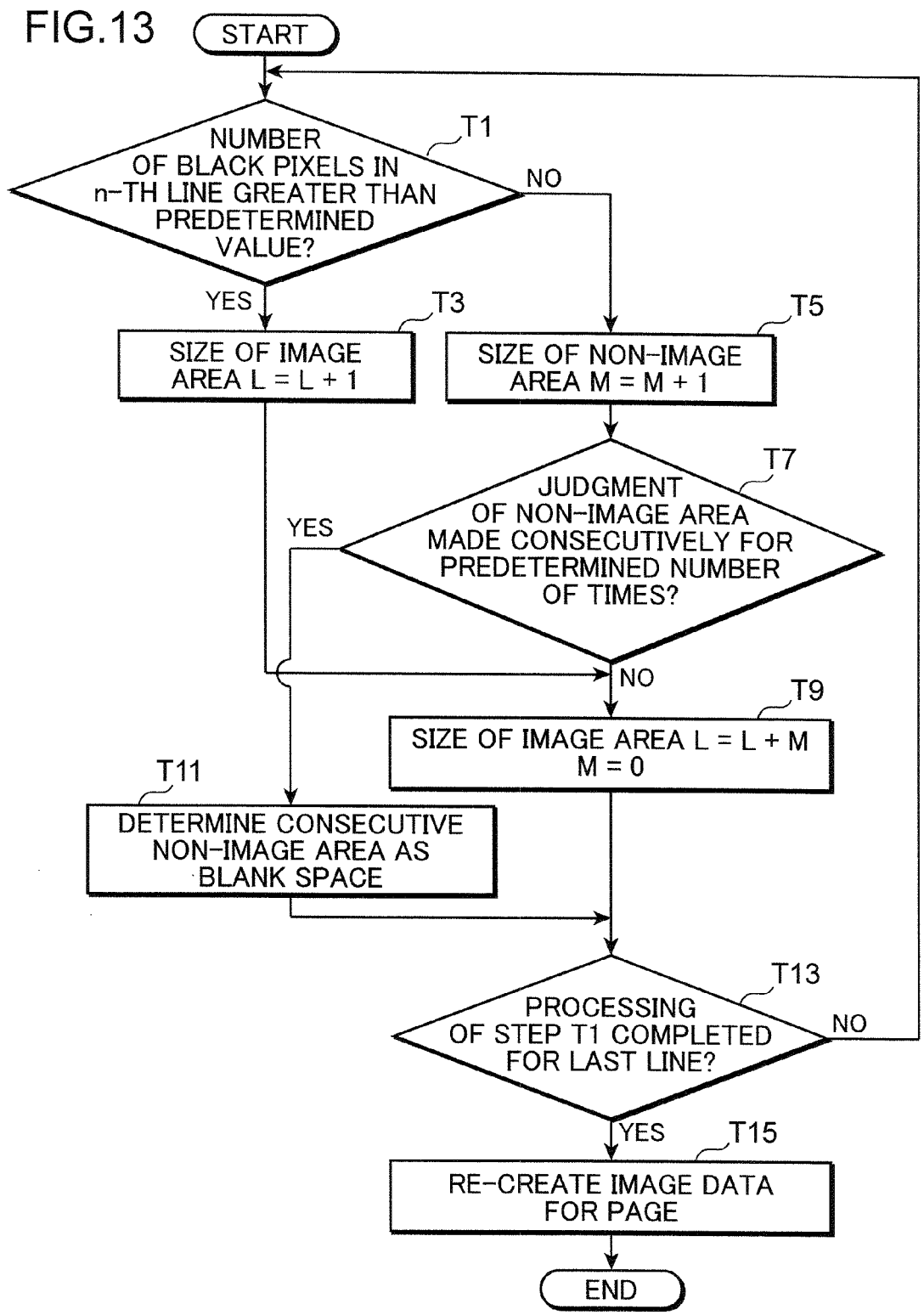
FIG. 13 is a flow chart for explaining a method of calculating an image area size.

FIG. 13 is a flow chart for explaining a method of calculating a size of the image area 55 with the image area calculating unit 521. Whether or not the number of black pixels in an n-th line of the print area 45 of a page is greater than a predetermined value is determined sequentially from a first line of the print area 45 (step T1). When the number of black pixels in the n-th line of the print area 45 is greater than the predetermined value (Yes in step T1) or, in other words, when the number of black pixels in the n-th line of the print area 45 is relatively large, the line is assumed to be the image area 55. The n-th line is then added to a size L of the image area 55 (step T3). The method then advances to step T9. Processing of step T9 will be described later.

On the other hand, when the number of black pixels in the n-th line is smaller than the predetermined value (No in step T1) or, in other words, when the number of white pixels in the n-th line is relatively large, the line is assumed to be a non-image area. The n-th line is added to a size M of the non-image area (step T5).

When a judgment of a non-image area with respect to a line is not consecutively made a predetermined number of times (No in step T7), the non-image areas are not assumed to be blank spaces and the size M of the non-image area is added to the size L of the image area 55 (step T9). The method then advances to step T13. In contrast, when a judgment of a non-image area with respect to a line is consecutively made a predetermined number of times (Yes in step T7), the non-image areas are assumed to be blank spaces (step T11) and the method advances to step T13.

When processing of step T1 on a final line in the print area 45 has not been completed (No in step T13), the method returns to step T1. When processing of step T1 on the final line in the print area 45 has been completed (Yes in step T13), image data of the page is re-created based on steps T9 and T11 (step T15). For example, when a blank space exists between an image area 55 and another image area 55 on a single page, processing is performed to delete the blank space and connect the image areas 55. This concludes the description of the method for calculating a size L of the image area 55 in step S33.

Let us now return to the description of the flow shown in FIG. 11. The page editing unit 515 determines whether or not the size L of the image area 55 calculated in step S33 is of the first page P1 (step S35). If the size L of the image area 55 is of the first page P1 (Yes in step S35), 1 is added to n to obtain a new n (step S37) and the flow returns to step S33. Subsequently, a size L of an image area 55 of the second page P2 is calculated by the image area calculating unit 521.

When the size L of the image area 55 of the second page P2 is calculated in step S33, the page editing unit 515 makes a determination of No in step S35. The image area synthesis judging unit 523 then determines whether or not a value that is a sum of a usage rate of the print area 45 by the image area 55 of the first page P1 and a usage rate of the print area 45 by the image area 55 of the second page P2 is smaller than a predetermined value (for example, 140%) (step S39). In other words, a determination is made on whether or not a value that is a sum of sizes of image areas of two adjacent pages is smaller than a predetermined value. If the total value is not smaller than the predetermined value (No in step S39), the image area 55 of the first page P1 and the image area 55 of the second page P2 are not synthesized and the flow proceeds to step S41.

In step S41, a determination is made on whether or not the size L of the image area 55 calculated in step S33 is of a final page. Since the second page P2 is not the final page, 1 is added to n to obtain a new n (step S43), and the flow returns to step S33 to calculate a size L of the image area 55 of the third page P3.

Figure 14:
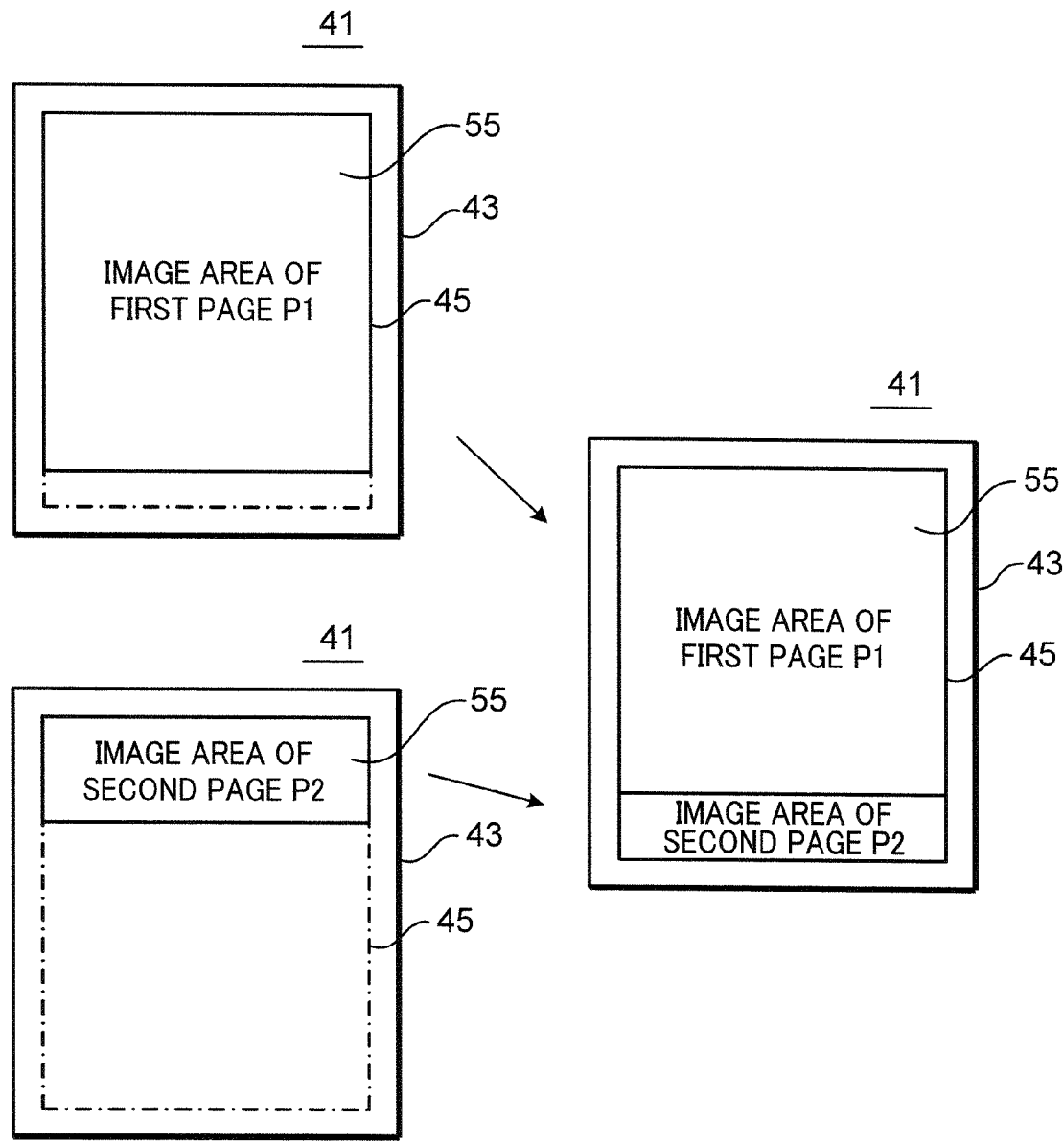
FIG. 14 is a diagram for explaining reducing and synthesizing an image area of a first page and an image area of a second page.

If the total value is smaller than the predetermined value (Yes in step S39), the image area 55 of the first page P1 and the image area 55 of the second page P2 are synthesized by the image area synthesizing unit 525. For the synthesis, the image area synthesizing unit 525 computes a reduction ratio that is applied when the image area 55 of the first page P1 and the image area 55 of the second page P2 are synthesized into a single page (step S47). As shown in FIG. 14, for example, let us assume that the usage rate of the print area 45 by the image area 55 of the first page P1 is 90% and the usage rate of the print area 45 by the image area 55 of the second page P2 is 20%. The image area 55 of the first page P1 and the image area 55 of the second page P2 are synthesized into a single page at a usage rate 100% of the print area 45.

$$100/(90+20)=0.91$$

In order to do so, areas of the image area 55 of the first page P1 and the image area 55 of the second page P2 must be reduced to 90%. Therefore, a reduction ratio of the image area 55 of the first page P1 and the image area 55 of the second page P2 is set to 10%.

The image area synthesizing unit 525 generates image data in which the image area 55 of the first page P1 and the image area 55 of the second page P2 are synthesized into a single page (step S49). Then, for image data of a plurality of pages stored in the image data storing unit 501, the image data substituting unit 527 replaces first page image data and second page image data with the single-page image data generated by the image area synthesizing unit 525 (step S51). The flow then advances to step S41.

Figure 5E:
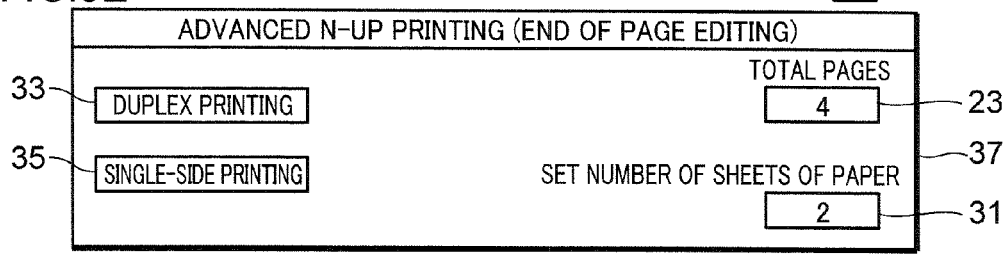

If Yes in step S41 or, in other words, if editing of the plurality of pages is concluded, a screen 37 indicating an end of page editing shown in FIG. 5E is displayed by the display control unit 511 on the display unit 403 (step S9 in FIG. 4). "4" is shown in the "total pages" field 23. This indicates that, for example, while the original document that is the aggregation object has six pages, the number of pages has been reduced to four by page editing. The screen 37 includes the button 33 inscribed "duplex printing" and the button 35 inscribed "single-side printing". As a result of page editing, N-up printing of four pages instead of six pages is performed by the processing of step S11 and thereafter.

As described above, according to the first embodiment, the number of pages that is aggregated onto a single side of a single sheet of paper (in step S15 in FIG. 4) in N-up printing of a plurality of pages is determined according to the number of sheets of paper set by the user (in step S11 in FIG. 4). Therefore, sheets of paper can be used efficiently and an area of unnecessary blank spaces can be reduced. As a specific example, when performing N-up printing of six pages, a reverse side of a second sheet of paper becomes a blank page in 2-in-1 duplex printing and one half of a reverse side of a first sheet of paper becomes a blank page in 4-in-1 duplex printing. On the other hand, according to the first embodiment, as shown in FIG. 10, since three pages can be aggregated onto a front side and three pages can be aggregated onto a reverse side in duplex printing, print sides can be used efficiently and an area of unnecessary blank spaces can be reduced.

In addition, according to the first embodiment, in step S17 in FIG. 4, a paper orientation which enables page reduction ratio to be lowered is selected when performing N-up printing of a plurality of pages with the number of pages described above. Therefore reduction ratios of the respective pages can be lowered.

Furthermore, according to the first embodiment, as described with reference to step S13 in FIG. 4, a user can select N-up printing by duplex printing or N-up printing by single-side printing using the screen 29 shown in FIG. 5D. Therefore, user convenience can be improved.

Moreover, according to the first embodiment, as described with reference to FIG. 11, N-up printing can be performed after performing page editing for reducing the number of plurality of pages. With page editing, when a value that is a sum of sizes L of image areas 55 of two adjacent pages is judged to be smaller than a predetermined value, the image areas 55 of the adjacent pages are synthesized into a single page as shown in FIG. 14. Therefore, N-up printing can be performed while reducing unnecessary blank spaces. In addition, since the number of plurality of pages can be reduced, a reduction ratio of each page can be lowered.

According to the present embodiment, as shown in step S41 in FIG. 11 and in FIG. 5E, after editing is performed by the page editing unit 515 to reduce the plurality of pages, the display control unit 511 causes the display unit 403 to display the screen 37 which indicates the number of the plurality of pages (total pages) after editing and which accepts an input of the number of sheets of paper set by the number-of-sheets setting unit 503. As a result, based on the number of the plurality of pages after editing (four pages), the number of sheets of paper that is used in N-up printing can be set. Therefore, compared to a case where the number of sheets of paper that is used in N-up printing is set based on the number of the plurality of pages before editing (six pages), the number of sheets of paper that is used in N-up printing can be reduced without varying the reduction ratio of each page.

Figure 15:
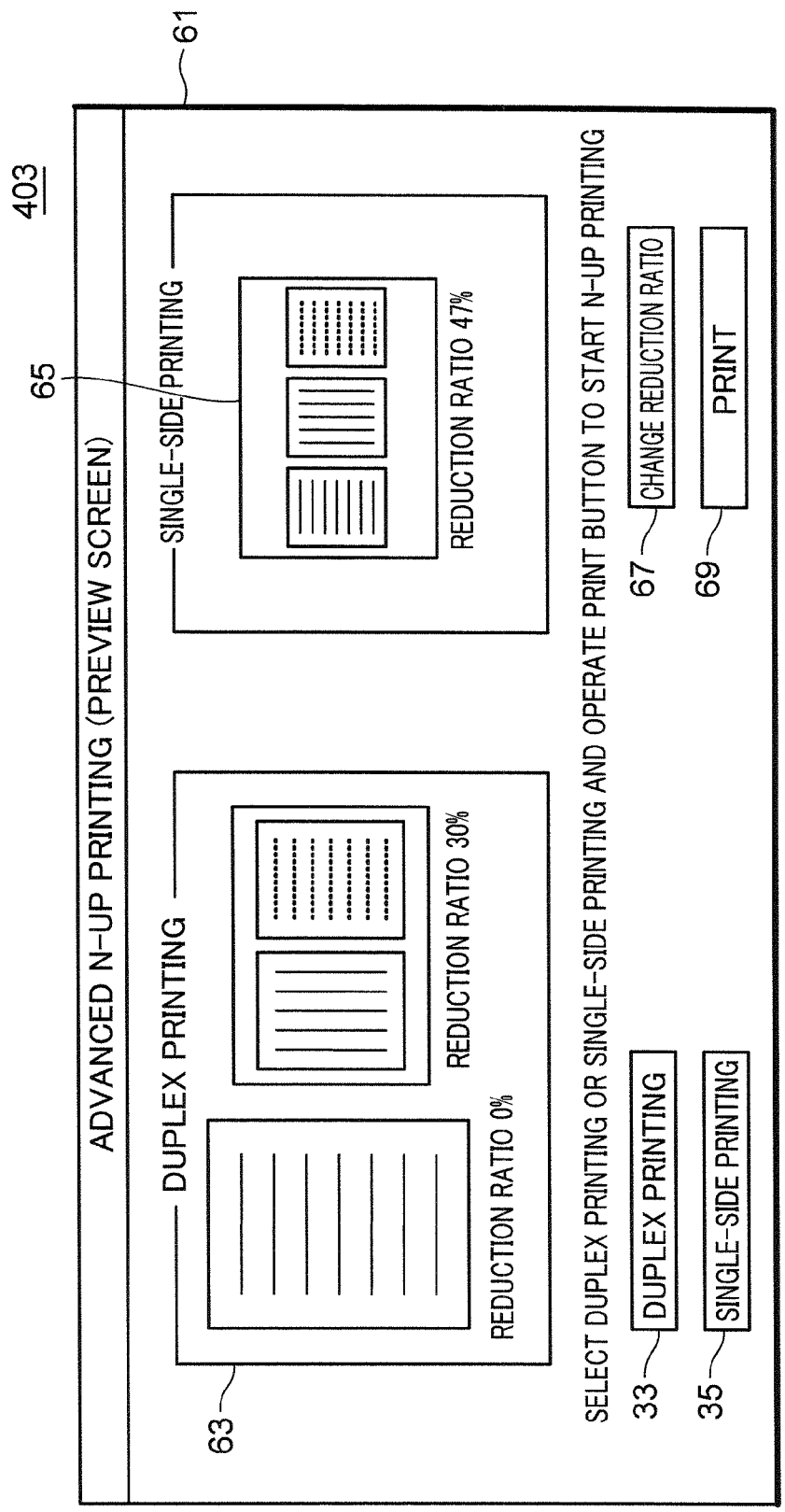
FIG. 15 is a diagram showing an N-up printing preview screen displayed on a display unit in a modification of the first embodiment.

A modification of the first embodiment is as follows. After step S11 in FIG. 4, the display control unit 511 causes a preview screen of N-up printing by duplex printing and N-up printing by single-side printing to be displayed on the display unit 403 to have a user select duplex printing or single-side printing. FIG. 15 is a diagram showing an example of a preview screen 61. The N-up printing shown aggregates three pages into one sheet of paper. The preview screen 61 includes a preview image 63 in a case of duplex printing, a preview image 65 in a case of single-side printing, the button 33 inscribed "duplex printing", the button 35 inscribed "single-side printing", a button inscribed "change reduction ratio", and a button 69 inscribed "print".

The preview image 63 in the case of duplex printing is the image in the duplex printing field in FIG. 8, and the preview image 65 in the case of single-side printing is the image in the single-side printing field. The user can compare the preview image 63 in the case of duplex printing to the preview image 65 in the case of single-side printing and select either duplex printing or single-side printing. Duplex printing is selected when the button 33 inscribed "duplex printing" is operated, and single-side printing is executed when the button 35 inscribed "single-side printing" is operated.

In addition, by operating the button 67 inscribed "change reduction ratio", in the case of duplex printing, the user can respectively change reduction ratios for an image formed on a front side of a sheet of paper (an image of a first page) and images formed on a reverse side of the sheet of paper (an image of a second page and an image of a third page). Meanwhile, in the case of single-side printing, a reduction ratio of images formed on a front side of a sheet of paper (an image of a first page, an image of a second page, and an image of a third page) can be changed. Consequently, for example, when duplex printing is selected, if the user does not want the reduction ratio of the first page and the reduction ratio of the second and the third pages to differ from each other, the user can conform the reduction ratio of the first page to the reduction ratio of the second and the third pages. In other words, if page reduction ratios differ from sheet to sheet or page reduction ratios differ between front and reverse sides of a sheet of paper in duplex printing, the user can perform N-up printing by conforming page reduction ratios.

When the user operates the button 69 inscribed "print", processing of step S19 in FIG. 4 is performed and N-up printing is executed.

As described above, according to the modification, either duplex printing or single-side printing can be selected while viewing the preview screen 61 of N-up printing by duplex printing and N-up printing by single-side printing. Therefore, the user can select between duplex printing and single-side printing in an accurate manner.

Next, a second embodiment of the present invention will be described with reference to FIG. 16. FIG. 16 is a block diagram showing a configuration of an information processing device 3 according to the second embodiment of the present invention. The information processing device 3 is a device which transmits image data to a printer 5, to cause the printer 5 to execute a job of printing an image indicated by the image data onto a sheet of paper.

The information processing device 3 is, for example, a personal computer and includes a main body part 700, an operating unit 721, a display unit 723, a recording medium reading unit 725, and a communication unit 727.

The main body part 700 includes functions of an image data storing unit 701, a number-of-sheets setting unit 703, a number-of-pages determining unit 705, a paper orientation selecting unit 707, a duplex/single-side printing setting unit 709, a display control unit 711, a reduction ratio setting unit 713, and a page editing unit 715. These functions are realized by a CPU, a ROM, a RAM, and the like included in the main body part 700.

The image data storing unit 701, the number-of-sheets setting unit 703, the number-of-pages determining unit 705, the paper orientation selecting unit 707, the duplex/single-side printing setting unit 709, the display control unit 711, the reduction ratio setting unit 713, and the page editing unit 715 respectively have functions similar to those of the image data storing unit 501, the number-of-sheets setting unit 503, the number-of-pages determining unit 505, the paper orientation selecting unit 507, the duplex/single-side printing setting unit 509, the display control unit 511, the reduction ratio setting unit 513, and the page editing unit 515 shown in FIG. 2.

The screens shown in FIGS. 5A to 5E and the screen shown in FIG. 15 are displayed on the display unit 723. However, since reading of an original document is not required in the second embodiment, "Set original document and operate start key" in FIG. 5B is not displayed.

The operating unit 721 is a keyboard for selecting advanced N-up printing, setting the number of sheets of paper, setting whether or not to perform page editing, setting either single-side printing or duplex printing, and the like using screens displayed on the display unit 723.

The recording medium reading unit 725 reads various programs and data recorded on a recording medium such as a CD-ROM, a flexible disk, and a DVD (digital versatile disk).

The communication unit 727 is connected to the printer 5 via, for example, a LAN 609. The communication unit 727 is equipped with a function of a transmitting unit which transmits, to the printer 5, the number of sheets of paper set by the number-of-sheets setting unit 703, the number of pages determined by the number-of-pages determining unit 705, data regarding a paper orientation selected by the paper orientation selecting unit 707, and image data of a plurality of pages stored in the image data storing unit 701.

In the second embodiment, the recording medium reading unit 725 reads a program of N-up printing stored in the recording medium and stores the program in a hard disk of the main body part 700. The CPU of the main body part 700 reads out the N-up printing program from the hard disk and stores the program in the RAM of the main body part 700. Consequently, the main body part 700 can execute the functions described above. As shown, the N-up printing program stored in the recording medium causes the information processing device 3 to function as the image data storing unit 701, the number-of-sheets setting unit 703, the number-of-pages determining unit 705, the paper orientation selecting unit 707, the duplex/single-side printing setting unit 709, the display control unit 711, the reduction ratio setting unit 713, the page editing unit 715, and the communication unit (transmitting unit) 727.

The second embodiment described above has the same operational advantages as the first embodiment.

This application is based on Japanese Patent application No. 2010-169321 filed in Japan Patent Office on Jul. 28, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming device comprising:
an image data storing unit which stores image data of a plurality of pages;
an operating unit;
a number-of-sheets setting unit which sets, in response to an operation performed on the operating unit, a number of sheets of paper that is used for N-up printing of the plurality of pages;
a number-of-pages determining unit which determines a number of pages that is aggregated on a single side of a single sheet of paper when N-up printing of the plurality of pages is performed using the number of sheets of paper set by the number-of-sheets setting unit;
a paper orientation selecting unit for selecting a paper orientation that enables a reduction ratio of a page to be lowered when N-up printing of the plurality of pages is performed on the number of pages determined by the number-of-pages determining unit;
an image forming unit which uses the image data of the plurality of pages stored in the image data storing unit to form images of the plurality of pages onto sheets of paper according to the number of sheets of paper set by the number-of-sheets setting unit, the number of pages determined by the number-of-pages determining unit, and the paper orientation selected by the paper orientation selecting unit; and a page editing unit that reduces a number of the plurality of pages, the page editing unit including:

an image area calculating unit which calculates a size of an image area in which an image of each of the plurality of pages is formed using image data of the plurality of pages stored in the image data storing unit;

an image area synthesis judging unit which judges, with respect to the size of the image area calculated by the image area calculating unit, whether or not a sum of sizes of image areas of two adjacent pages among respective pages is smaller than a predetermined value;

an image area synthesizing unit which generates, for two adjacent pages for which the sum is judged by the image area synthesis judging unit to be smaller than the predetermined value, image data in which the image areas of the two adjacent pages are synthesized into a single page; and an image data substituting unit which substitutes, for image data of the plurality of pages stored in the image data storing unit, image data of the two adjacent pages for which the sum is judged by the image area synthesis judging unit to be smaller than the predetermined value, by the single page image data generated by the image area synthesizing unit, wherein the number-of-pages determining unit determines the number of pages using the plurality of pages edited by the page editing unit, and the image forming unit forms images of the plurality of pages onto a sheet of paper using image data of the plurality of pages which is stored in the image data storing unit, the plurality of pages being edited by the page editing unit.

2. The image forming device according to claim 1, further comprising a duplex/single-side printing setting unit which makes a setting for selecting duplex printing or single-side printing when performing N-up printing of the plurality of pages in response to an operation performed on the operating unit, wherein the number-of-pages determining unit determines the number of pages according to whether the duplex printing or the single-side printing has been set by the duplex/single-side printing setting unit.

3. The image forming device according to claim 2, wherein the operating unit includes a display unit that displays a preview screen of N-up printing in a case of the duplex printing and in a case of the single-side printing when selecting the duplex printing or the single-side printing, and the image forming device includes a display control unit that causes the display unit to display the preview screen after the number of sheets of paper is set to the number-of-sheets setting unit.

4. The image forming device according to claim 3, further comprising a reduction ratio setting unit in which a setting for changing a reduction ratio of a page when performing N-up printing of the plurality of pages is made after the preview screen is displayed on the display unit and in response to an operation performed on the operating unit.

5. The image forming device according to claim 1, further comprising a display unit, and a display control unit, wherein after editing is performed by the page editing unit to reduce the number of the plurality of pages, the display control unit causes the display unit to display a screen which indicates the number of the plurality of pages after editing and which accepts an input of the number of sheets of paper set by the number-of-sheets setting unit.

6. The image forming device according to claim 1, wherein the selecting unit selects landscape as the paper orientation when the number of pages is two or three, and selects portrait as the paper orientation when the number of pages is four.

7. An information processing device comprising:

an image data storing unit which stores image data of a plurality of pages;

an operating unit;

a number-of-sheets setting unit which sets, in response to an operation performed on the operating unit, a number of sheets of paper that is used for N-up printing of the plurality of pages;

a number-of-pages determining unit which determines a number of pages that is aggregated on a single side of a single sheet of paper when N-up printing of the plurality of pages is performed using the number of sheets of paper set by the number-of-sheets setting unit;

a paper orientation selecting unit for selecting a paper orientation that enables a reduction ratio of a page to be lowered when N-up printing of the plurality of pages is performed on the number of pages determined by the number-of-pages determining unit;

a transmitting unit which transmits, to a printer, data of the number of sheets of paper set by the number-of-sheets setting unit, the number of pages determined by the number-of-pages determining unit, and the paper orientation selected by the paper orientation selecting unit, together with image data of the plurality of pages; and a page editing unit that reduces a number of the plurality of pages, the page editing unit including:

an image area calculating unit which calculates a size of an image area in which an image of each of the plurality of pages is formed using image data of the plurality of pages stored in the image data storing unit;

an image area synthesis judging unit which judges, with respect to the size of the image area calculated by the image area calculating unit, whether or not a sum of sizes of image areas of two adjacent pages among respective pages is smaller than a predetermined value;

an image area synthesizing unit which generates, for two adjacent pages for which the sum is judged by the image area synthesis judging unit to be smaller than the predetermined value, image data in which the image areas of the two adjacent pages are synthesized into a single page; and an image data substituting unit which substitutes, for image data of the plurality of pages stored in the image data storing unit, image data of the two adjacent pages for which the sum is judged by the image area synthesis judging unit to be smaller than the predetermined value, by the single page image data generated by the image area synthesizing unit, wherein the number-of-pages determining unit determines the number of pages using the plurality of pages edited by the page editing unit.

8. The information processing device according to claim 7, further comprising a duplex/single-side printing setting unit which makes a setting for selecting duplex printing or single-side printing when performing N-up printing of the plurality of pages in response to an operation performed on the operating unit, wherein the number-of-pages determining unit determines the number of pages according to whether the duplex printing or the single-side printing has been set by the duplex/single-side printing setting unit.

9. The information processing device according to claim 8, wherein the operating unit includes a display unit that displays a preview screen of N-up printing in a case of the duplex printing and in a case of the single-side printing when selecting the duplex printing or the single-side printing, and the information processing device includes a display control unit that causes the display unit to display the preview screen after the number of sheets of paper is set by the number-of-sheets setting unit.

10. The information processing device according to claim 9, further comprising a reduction ratio setting unit in which a setting for changing a reduction ratio of a page when performing N-up printing of the plurality of pages is made after the preview screen is displayed on the display unit and in response to an operation performed on the operating unit.

11. The information processing device according to claim 7, further comprising a display unit, and a display control unit, wherein after editing is performed by the page editing unit to reduce the number of the plurality of pages, the display control unit causes the display unit to display a screen which indicates the number of the plurality of pages after editing and which accepts an input of the number of sheets of paper set by the number-of-sheets setting unit.

12. The information processing device according to claim 7, wherein the selecting unit selects landscape as the paper orientation when the number of pages is two or three, and selects portrait as the paper orientation when the number of pages is four.

\* \* \* \* \*